US009155040B2

(12) United States Patent
Batchu et al.

(10) Patent No.: US 9,155,040 B2
(45) Date of Patent: Oct. 6, 2015

(54) METHODS AND DEVICES FOR PROCESSING A GENERAL PAGE MESSAGE IN SLOTTED IDLE MODE

(75) Inventors: Bhaskara V. Batchu, Hyderabad (IN); Aditya Bohra, Hyderabad (IN); Anand Rajurkar, Hyderabad (IN); Nawal Kishor Mishra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 13/594,499

(22) Filed: Aug. 24, 2012

(65) Prior Publication Data

US 2014/0056191 A1    Feb. 27, 2014

(51) Int. Cl.
*H04W 52/02* (2009.01)

(52) U.S. Cl.
CPC ...... *H04W 52/0209* (2013.01); *H04W 52/0216* (2013.01); *H04W 52/0274* (2013.01); *H04W 52/0283* (2013.01)

(58) Field of Classification Search
CPC ................................................ H04W 52/0283
USPC .......... 370/311, 318, 329, 341, 348; 455/572, 455/343.1; 329/345; 375/340
See application file for complete search history.

(56) References Cited

U.S. PATENT DOCUMENTS

| | | | |
|---|---|---|---|
| 6,078,626 A * | 6/2000 | Ramesh | 375/262 |
| 6,577,608 B1 * | 6/2003 | Moon et al. | 370/311 |
| 6,590,886 B1 | 7/2003 | Easton et al. | |
| 7,400,595 B2 | 7/2008 | Callaway et al. | |
| 7,558,226 B2 | 7/2009 | Anderson et al. | |
| 7,720,513 B2 * | 5/2010 | Enenkl | 455/572 |
| 7,925,908 B2 | 4/2011 | Kim | |
| 2002/0105375 A1 * | 8/2002 | Sorokine | 329/345 |
| 2002/0181559 A1 * | 12/2002 | Heidari-Bateni et al. | 375/148 |
| 2004/0258102 A1 * | 12/2004 | Callaway et al. | 370/511 |
| 2007/0109987 A1 * | 5/2007 | Kohlmann et al. | 370/318 |
| 2007/0213028 A1 * | 9/2007 | Shohara et al. | 455/343.1 |
| 2008/0056170 A1 | 3/2008 | Komulainen et al. | |
| 2008/0056411 A1 * | 3/2008 | Flachs et al. | 375/340 |
| 2008/0280656 A1 | 11/2008 | Gonikberg et al. | |
| 2009/0209272 A1 | 8/2009 | Palanki et al. | |
| 2010/0165899 A1 * | 7/2010 | Van Bosch et al. | 370/311 |
| 2010/0214968 A1 | 8/2010 | Paliwal et al. | |
| 2010/0330992 A1 | 12/2010 | Bhattacharjee et al. | |

OTHER PUBLICATIONS

International Search Report and Written Opinion—PCT/US2012/052496—ISA/EPO—Aug. 5, 2013.
Partial International Search Report—PCT/US2012/052496—ISA/EPO—Jun. 6, 2013.

* cited by examiner

*Primary Examiner* — Brian D Nguyen
*Assistant Examiner* — Toan Nguyen
(74) *Attorney, Agent, or Firm* — Michael F. Taveira

(57) ABSTRACT

Access terminals are adapted to facilitate power conservation by selectively powering down one or more hardware block when processing a general page message (GPM) received in slotted idle mode. An access terminal may include a processor core, a de-interleaver, a decoder and a firmware block. The firmware block may be adapted to enable the processor core to sleep while the firmware block collects samples of a received transmission and extracts symbols from the collected samples. The firmware block may further power ON the de-interleaver to de-interleave the extracted symbols, and the decoder to decode the de-interleaved symbols. Other aspects, embodiments, and features are also included.

36 Claims, 8 Drawing Sheets

METHODS AND DEVICES FOR PROCESSING A GENERAL PAGE MESSAGE IN SLOTTED IDLE MODE

TECHNICAL FIELD

The following relates generally to wireless communication, and more specifically to methods and devices for facilitating power conservation when processing a general page message (GPM) in slotted idle mode.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Access terminals adapted to access one or more wireless communications systems are becoming increasingly popular, with consumers often using power-intensive applications that run on increasingly complicated and power consuming access terminals. Access terminals are typically battery-powered and the amount of power a battery can provide between charges is generally limited. Features which may assist in extending the operating life of the access terminal between recharging are therefore beneficial.

BRIEF SUMMARY OF SOME EXAMPLES

Various features and aspects of the present disclosure are adapted to facilitate power conservation when processing a general page message (GPM) in slotted idle mode. At least one aspect of the present disclosure includes access terminals including a communications interface and a storage medium, each coupled with a processing circuit.

According to one or more examples of an access terminal, the processing circuit may be adapted to enter an awake state of a slotted idle mode. The processing circuit may power down a plurality of hardware blocks of the processing circuit during the awake state, such as a processor core, a de-interleaver, and/or a decoder. The processing circuit may collect samples of a wireless transmission received via the communications interface, and extract a plurality of symbols from the collected samples. The processing circuit may power up individual hardware blocks from among the plurality of hardware blocks for processing the plurality of symbols.

According to one or more additional examples of an access terminal, the processing circuit may be adapted to enter an awake state of a slotted idle mode. During the awake state, the processing circuit may concurrently perform a reacquisition procedure and demodulation of a wireless transmission received via the communications interface.

Additional aspects of the present disclosure include methods operational on an access terminal and/or access terminals including means for performing such methods. One or more examples of such methods may include receiving a wireless transmission including a general page message (GPM) during an awake cycle of a slotted idle mode. Symbols may be extracted from a plurality of collected samples of the received wireless transmission. One or more hardware blocks from among a plurality of hardware blocks may be selectively powered up and powered down for processing the received wireless transmission to obtain the general page message (GPM).

One or more additional examples of such methods may include entering an awake state of a slotted idle mode. During the awake state, a reacquisition procedure may be performed. Demodulation of a multipath wireless transmission may also be performed concurrently with performing the reacquisition procedure.

Further aspects of the present disclosure include processor-readable mediums including programming operational on an access terminal. According to one or more examples, such programming may be adapted to power down a plurality of hardware blocks of a processing circuit. The programming may further be adapted to collect samples of a wireless transmission during an awake state of a slotted idle mode, and extract a plurality of symbols from the collected samples. The programming may also be adapted to selectively power up individual hardware blocks from among the plurality of hardware blocks for processing the plurality of symbols.

According to one or more additional examples, the programming may be adapted to enter an access terminal into an awake state of a slotted idle mode. The programming may further be adapted to perform a reacquisition procedure while concurrently demodulating a multipath wireless transmission.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
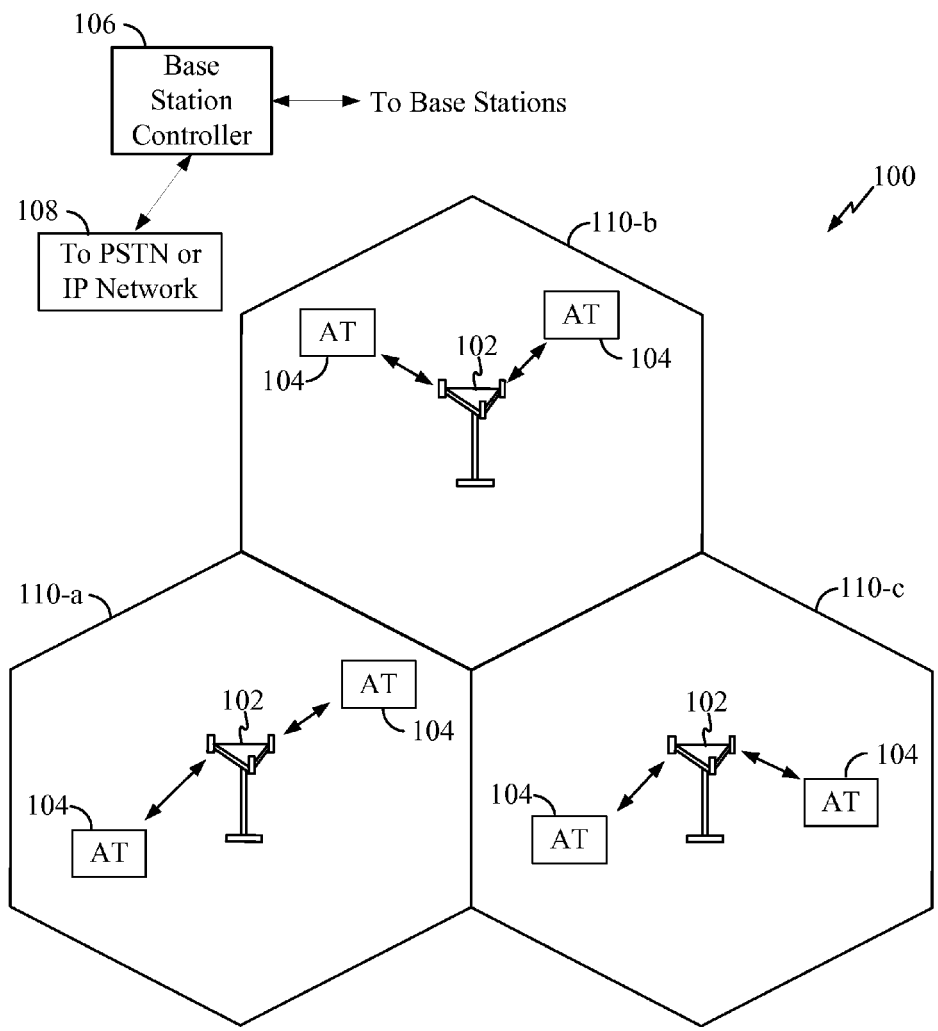
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
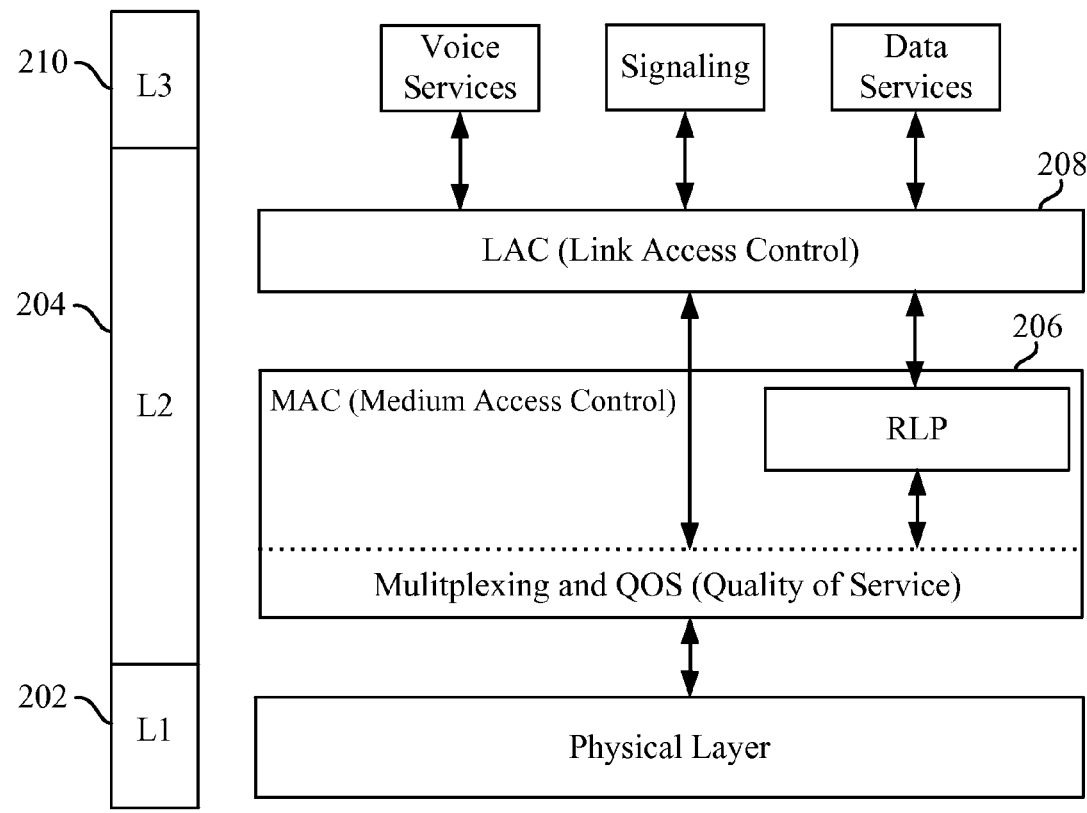
FIG. 2 is a block diagram illustrating an example of a protocol stack architecture which may be implemented by an access terminal.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

As an access terminal 104 operates within the system 100, the access terminal 104 may employ various modes of operation, including a dedicated mode and an idle mode. In dedicated mode, the access terminal 104 may actively exchange data (e.g., voice or data calls or sessions) with one or more base stations (e.g., base stations 102 in FIG. 1). In idle mode, the access terminal 104 may monitor control channels, such as a paging channel (PCH) for paging messages. Such paging messages may include messages that alert the access terminal 104 to the occurrence of an incoming voice or data call and control/overhead messages that carry system information and other information for the access terminal 104.

When operating in the idle mode, paging messages may be sent on the paging channel to the access terminal 104 at designated time intervals. Instead of monitoring the paging channel continuously, the access terminal 104 can conserve power by periodically monitoring the paging channel in a slotted idle mode, which may also be referred to by those of skill in the art as discontinuous reception mode or DRX mode. In the slotted idle mode, the access terminal 104 wakes up from a "sleep" state at known time intervals, enters an "awake" state and processes the paging channel for messages. If additional communication is not required, the access terminal 104 can revert back to the sleep state until the next designated time.

Figure 3:
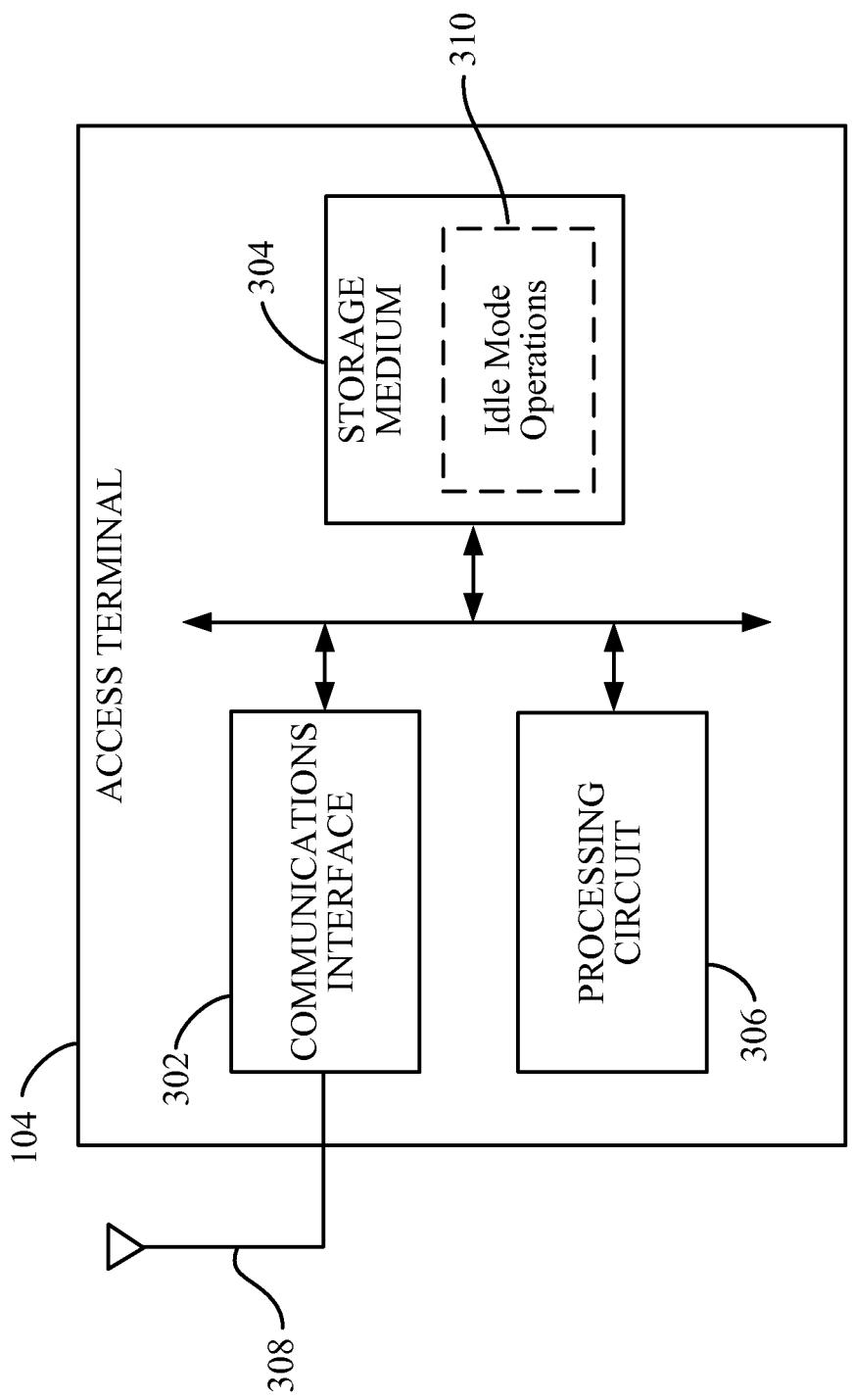
FIG. 3 is a block diagram illustrating select components of an access terminal according to at least one example.

FIG. 3 shows a block diagram illustrating select components of an access terminal 104 according to at least one example of the present disclosure. The access terminal 104 includes a communications interface 302 and a storage medium 304. These components can be coupled to and/or placed in electrical communications with a processing circuit 306.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 308 for wireless communications within a wireless communications system. The communications interface 302 can be configured with one or more standalone receivers and/or transmitters, as well as one or more transceivers.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 306 when executing programming. The storage medium 304 may be any available media that can be accessed by a general purpose or special purpose processor, including portable or fixed storage devices, optical storage devices, and various other mediums capable of storing, containing or carrying programming By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. For example, the storage medium 304 may include idle mode operations 310 adapted for regulating operations at one or more hardware blocks of the processing circuit 306, regulating power to one or more hardware blocks of the processing circuit 306, and/or regulating a sequence of operations when in idle mode, as described in further detail below. The idle mode operations may comprise programming implemented at layer 1 of the protocol stack architecture depicted in FIG. 2 and/or as firmware associated with the firmware block 414 described below with reference to FIG. 4.

The processing circuit 306 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 306 is arranged to obtain, process and/or send data, control data access and storage, issue commands, and control other desired operations. The processing circuit 306 may include circuitry configured to implement desired programming provided by appropriate media in at least one example. For example, the processing circuit 306 may be implemented as one or more processors, one or more controllers, and/or other structure configured to execute executable programming. Examples of the processing circuit 306 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" in relation to the processing circuit 306 may refer to the processing circuit 306 being one or more of configured, employed, implemented, and/or programmed to perform a particular process, function, step and/or routine according to various features described herein.

Figure 4:
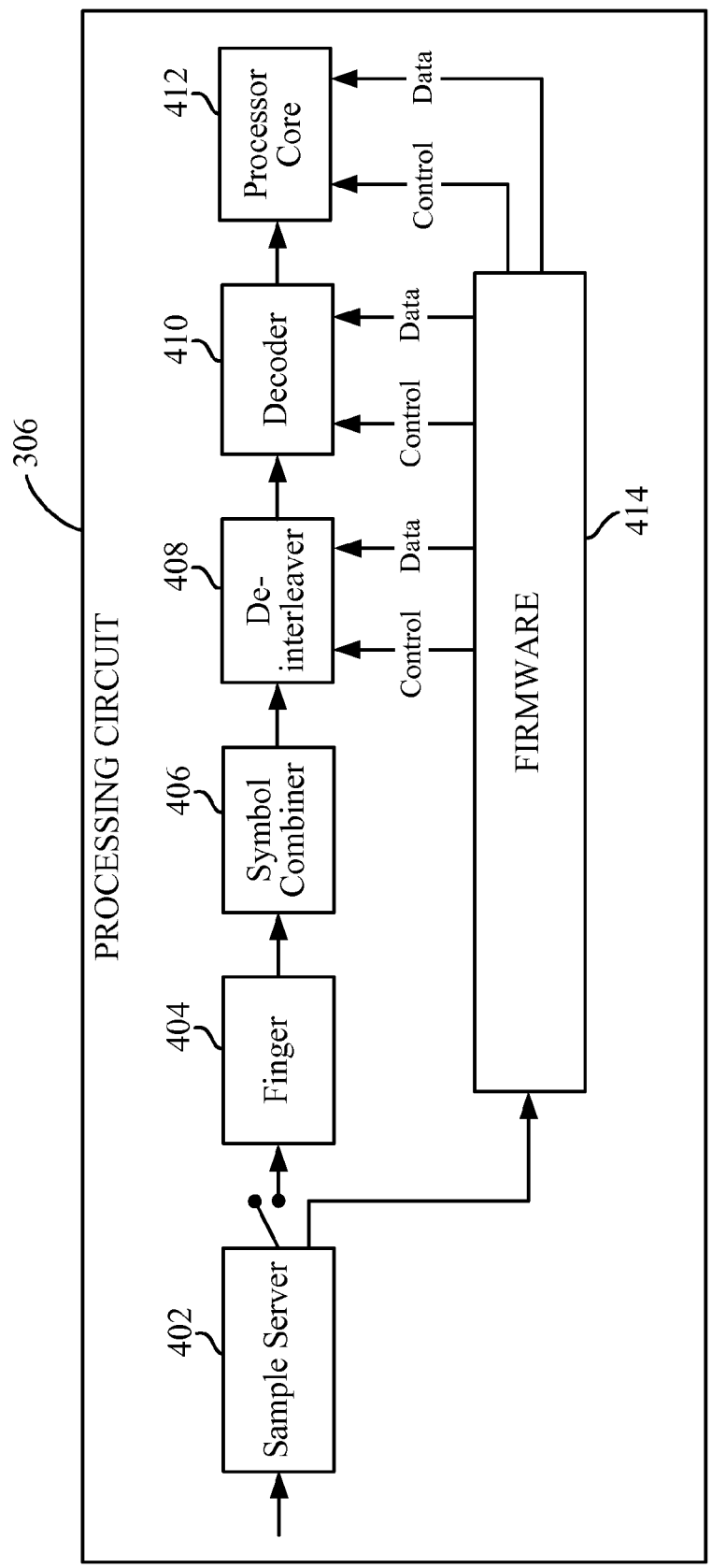
FIG. 4 is a block diagram illustrating select components of the processing circuit of FIG. 3 according to at least one example.

According to at least one example of the access terminal 104, the processing circuit 306 may include various hardware blocks for facilitating reception of wireless communications from one or more remote devices. FIG. 4 is a block diagram illustrating select components of the processing circuit 306 according to at least one example of the disclosure. As shown, the processing circuit 306 includes a plurality of hardware blocks, such as a sample server 402, a finger block 404, a symbol combiner 406 (e.g., maximal ratio combiner (MRC)), a de-interleaver 408, a decoder 410 (e.g., a Viterbi decoder and/or a turbo decoder), a processor core 412 (e.g., a CPU such as an advanced RISC machine (ARM)), and a firmware block 414. One or more of these hardware blocks may be implemented as a part of a common processor, and/or at least some of the hardware blocks may be implemented as separate processing components of the processing circuit 306.

The firmware block 414 may include programming stored on one or more components of the storage medium 304. The programming may form at least a part of the idle mode operations depicted in FIG. 3. In some examples, the firmware block 414 may be implemented as one or more components of the processing circuit 306. By way of example and not limitation, the firmware block 414 can be implemented by a digital signal processing component (e.g., an MDSP) of the processing circuit 306. Although the firmware block 414 is shown integral to the processing circuit 306 in the illustrated example, any programming associated with the firmware block 414 may be located separate from the processing circuit 306 in other examples, as noted above regarding the storage medium 304.

As shown, the firmware block 414 is operably coupled with at least the sample server 402, the de-interleaver 408, the decoder 410 and the processor core 412. In particular, the firmware block 414 may employ a control line and a data line with the de-interleaver 408, the decoder 410 and the processor core 412. The control line can be employed by the firmware block 414 to power up or down a particular hardware block (e.g., power ON or OFF, awaken or enable to sleep). The data line can be employed by the firmware block 414 to transfer data between the firmware block 414 and one or more hardware blocks.

As the access terminal 104 operates in slotted idle mode, one or more general page messages (GPMs) may be received by the access terminal 104 during each slot while the access terminal 104 is in an awake state. According to an aspect of the present disclosure, the access terminal 104 may employ either of two paths for processing received data when a downlink transmission is received in the awake state of the idle mode.

In one example, the access terminal 104 may select a first path, where a received transmission can be provided to the sample server 402, including samples from a plurality of multipath components. The samples from each individual multipath signal can be provided to a respective finger in the finger block 404. The contribution of all fingers can be combined at the symbol combiner 406 to make the most use of the different transmission characteristics of each transmission path. After combination, the symbols can be de-interleaved at the de-interleaver 408. That is, the symbols can be re-ordered into their original order by the de-interleaver 408. The decoder 410 can decode the coded symbols to obtain a decoded general page message (GPM), and the processed data can be provided to the processor core 412 for further operations.

In another example, the access terminal 104 is adapted to switch from the above path and select a different path, which includes the firmware block 414. In this example, when a transmission is received, the firmware block 414 is adapted to power OFF at least some of the various hardware blocks. For example, the firmware block 414 may power OFF the de-interleaver 408 and the decoder 410, and may enable the processor core 412 to sleep.

In this example, instead of processing the received transmission using the finger block 404 for a plurality of multipath signals and the symbol combiner 406 for combining the plurality of multipath signals, the firmware block 414 is adapted to collect samples from the sample server 402 for a single path and process the samples for that single path to extract symbols therefrom. The firmware block 414 may collect samples from the sample server 402 for whichever path is determined to be the strongest path. In some example, the strongest path may be determined from a pilot reacquisition procedure conducted during the current awake cycle, or from a pilot reacquisition procedure conducted during a previous awake cycle (as described in further detail below). Because the firmware block 414 simply employs the strongest single multipath signal, the finger block 404 and the symbol combiner 406 can be powered OFF and skipped in the processing sequence according to this example.

After extracting symbols from the obtained samples, the firmware block 414 may power ON the de-interleaver 408 and may convey the extracted symbols to the de-interleaver 408. The de-interleaver 408 can re-order the symbols into their original order. The firmware block 414 may power ON the decoder 410. After the decoder 410 is powered ON, the re-ordered symbols can be conveyed to the decoder 410. According to various examples, the re-ordered symbols may be conveyed directly from the de-interleaver 408, or the firmware block 414 may obtain the re-ordered symbols from the de-interleaver 408 and then convey those re-ordered symbols to the decoder 410. When the de-interleaver 408 has completed the re-ordering operations and the re-ordered symbols are obtained therefrom, the firmware block 414 may power OFF the de-interleaver 408.

The decoder 410 can decode the re-ordered symbols to obtain information bits. For example, the decoder 410 may be adapted to employ a Viterbi decoding algorithm and/or a turbo decoding algorithm to decode the re-ordered symbols. In this example, the information bits may be associated with a general page message (GPM). The firmware block 414 may be adapted to determine whether the received general page message (GPM) is an empty general page message (GPM) (e.g., has no pages for any access terminals) or whether it is a non-empty general page message (GPM) (e.g., has one or more pages for one or more access terminals).

If the received general page message (GPM) is an empty general page message (GPM), the firmware block 414 can be adapted to power on the processor core 412 for performing one or more operations adapted to return the access terminal 104 to the sleep state of the slotted idle mode. On the other hand, if the general page message (GPM) is not empty, then the firmware block 414 can be adapted to determine whether the non-empty general page message (GPM) includes a page intended for the access terminal 104. If a page is identified for the access terminal 104, then the firmware block 414 may power up (e.g., wake up) the processor core 412 to facilitate further communications with the communications system. If the non-empty general page message (GPM) does not include a page intended for the access terminal 104, then the firmware block 414 may process one or more subsequent general page messages (GPMs) in a manner similar to the example above employing the firmware block 414 until either a page is received for the access terminal 104 or an empty general page message is received indicating that the access terminal 104 can return to the sleep state.

When employing the above described second example path, the access terminal 104 may realize significant power savings resulting from powering OFF and skipping the finger block 404 and the symbol combiner 406, from powering OFF the de-interleaver 408 and the decoder 410, and from putting the processor core 412 to sleep, except for periods when a particular hardware block is employed for a particular purpose and is accordingly powered up (e.g., power ON, awakened).

Figure 5:
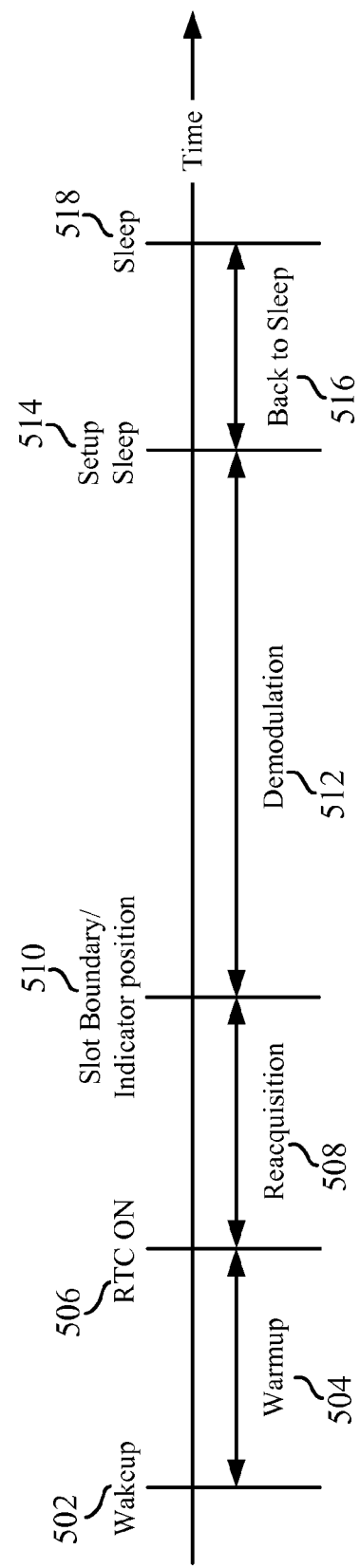
FIG. 5 is a time diagram illustrating at least one example of some operations performed by an access terminal when monitoring a paging channel (PCH) in slotted idle mode.

FIG. 5 shows a time diagram depicting at least one example of some of the above described operations performed by an access terminal 104 when monitoring a paging channel (PCH) in the slotted idle mode. At a time prior to the expected time interval when the access terminal 104 is expected to be monitoring and processing transmissions on the paging channel (PCH), the access terminal 104 wakes up at 502 and begins warming up one or more receiver components at 504 (e.g., one or more receiver components of the communications interface 302 and/or one or more hardware blocks of the processing circuit 306). After the warm-up period 504, the receiver can be powered ON at 506 and the access terminal 104 may perform a reacquisition of the base station at 508. This reacquisition 508 can include reacquisition of a pilot signal to determine factors such as timing synchronization, and which multipath pilot signal is the strongest. In this example, the results from the reacquisition 508 can be employed for processing transmissions received during the slot period.

At 510, the beginning of the slot may be identified by an indicator at the slot boundary and the access terminal 104 receives and demodulates 512 any received transmissions (e.g., any received general page messages (GPMs). The demodulation 512 may include collection of samples by the firmware block 414 (see FIG. 4) for a single path of a multipath signal that was determined to be the strongest path in the reacquisition 508. Symbols are extracted from the collected samples by the firmware block 414, and the firmware block 414 employs the de-interleaver 408 and the decoder 410 to process the symbols and obtain a general page message (GPM).

If a general page message (GPM) includes a page intended for the receiving access terminal 104, the access terminal 104 can further communicate with the base station 102 to complete any requested operations. Otherwise, the access terminal 104 demodulates all received general page messages (GPMs) until an empty general page message (GPM) is received. As noted above, the empty general page message (GPM) may serve as an indicator that the access terminal 104 can return to the sleep state of the slotted idle mode. Accordingly, at step 514, the access terminal 104 can initiate sleep setup to begin putting the access terminal 104 back into the sleep state of the slotted idle mode 516. Finally, at 518, the access terminal is returned to the sleep state and may remain in the sleep state until the next scheduled slot.

Figure 6:
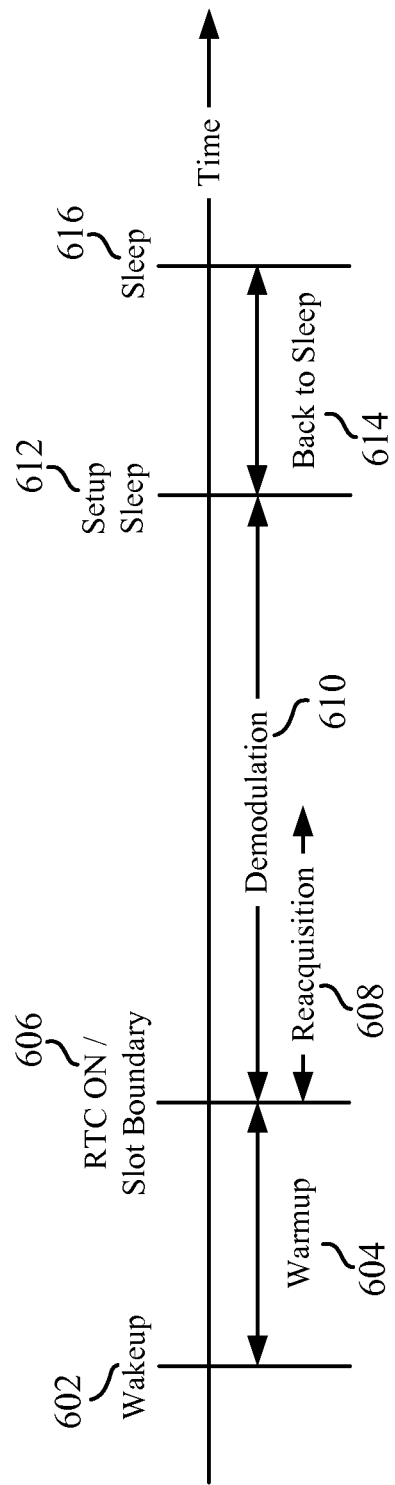
FIG. 6 is a time diagram illustrating performance by an access terminal of demodulation and reacquisition in parallel when monitoring a paging channel (PCH) in slotted idle mode according to at least one example.

According to at least one aspect of the present disclosure, the access terminal 104 can be adapted to perform at least a portion of the reacquisition and at least a portion of the demodulation in parallel (e.g., at least substantially at the same time). Turning to FIG. 6, another time diagram is illustrated showing performance of demodulation and reacquisition in parallel. In this example, the access terminal 104 initiates the awake state by waking up at 602 and warming up one or more receiver components at 604 (e.g., one or more receiver components of the communications interface 302 and/or one or more hardware blocks of the processing circuit 306). The wakeup 602 may occur in response to a wakeup interrupt request (IRQ), and may occur early enough for the receiver to be powered ON in time for the slot boundary 606.

Instead of performing a reacquisition with a base station prior to the slot boundary 606, the access terminal 104 is adapted to perform the reacquisition procedures 608 after the slot boundary 606. The reacquisition procedure can include reacquisition of the pilot signal to determine factors such as timing drift since the previous awake cycle, as well as the strongest multipath pilot signal. Instead of employing the results from the present reacquisition procedure 608, the access terminal 104 stores this information for use in the next awake cycle. In some examples, the reacquisition procedure may also include determining one or more channel conditions, such as a signal-to-interference ratio (e.g., filtered pilot Ec/Io and/or instantaneous pilot Ec/Io), and/or how much noise is associated with the channel. These results may be employed by the access terminal 104 to determine whether or not it should continue performing reacquisition and demodulation in parallel. As a result of performing the reacquisition after the slot boundary 606 instead of before the slot boundary, the access terminal 104 can conserve power by remaining in the sleep state for an extended period of time.

At the slot boundary 606, and following the warm-up 604, the access terminal 104 also commences demodulation 610. In this example, the demodulation 610 can be based on the results obtained from a previously performed reacquisition procedure. That is, the demodulation 610 is based on the stored results obtained from a reacquisition procedure performed in the previous awake cycle. The demodulation 610 may include collection of samples by the firmware block 414 (see FIG. 4) for a single path of a multipath signal that was determined to be the strongest path in the previous awake cycle. The demodulation 610 can also include extraction by the firmware block 414 of symbols from the collected samples, and employment by the firmware block 414 of the de-interleaver 408 and the decoder 410 to process the symbols and obtain the general page message (GPM).

Like the example depicted by FIG. 5, the example shown in FIG. 6 illustrates the case where there is no page message intended for the access terminal 104 is received. Accordingly, after an empty general page message (GPM) is received, the access terminal 104 begins a sleep setup at 612 and initiates procedures for putting the access terminal 104 back to sleep at 614. In this example, during the back to sleep operations at 614, the access terminal 104 may determine whether the channel conditions are sufficiently good and/or whether the timing drift is less than some threshold to continue performing reacquisition and demodulation at least substantially at the same time for a subsequent awake cycle or whether the access terminal 104 should return to the sequence depicted in FIG. 5. At 616, the access terminal 104 returns to the sleep state.

Figure 7:
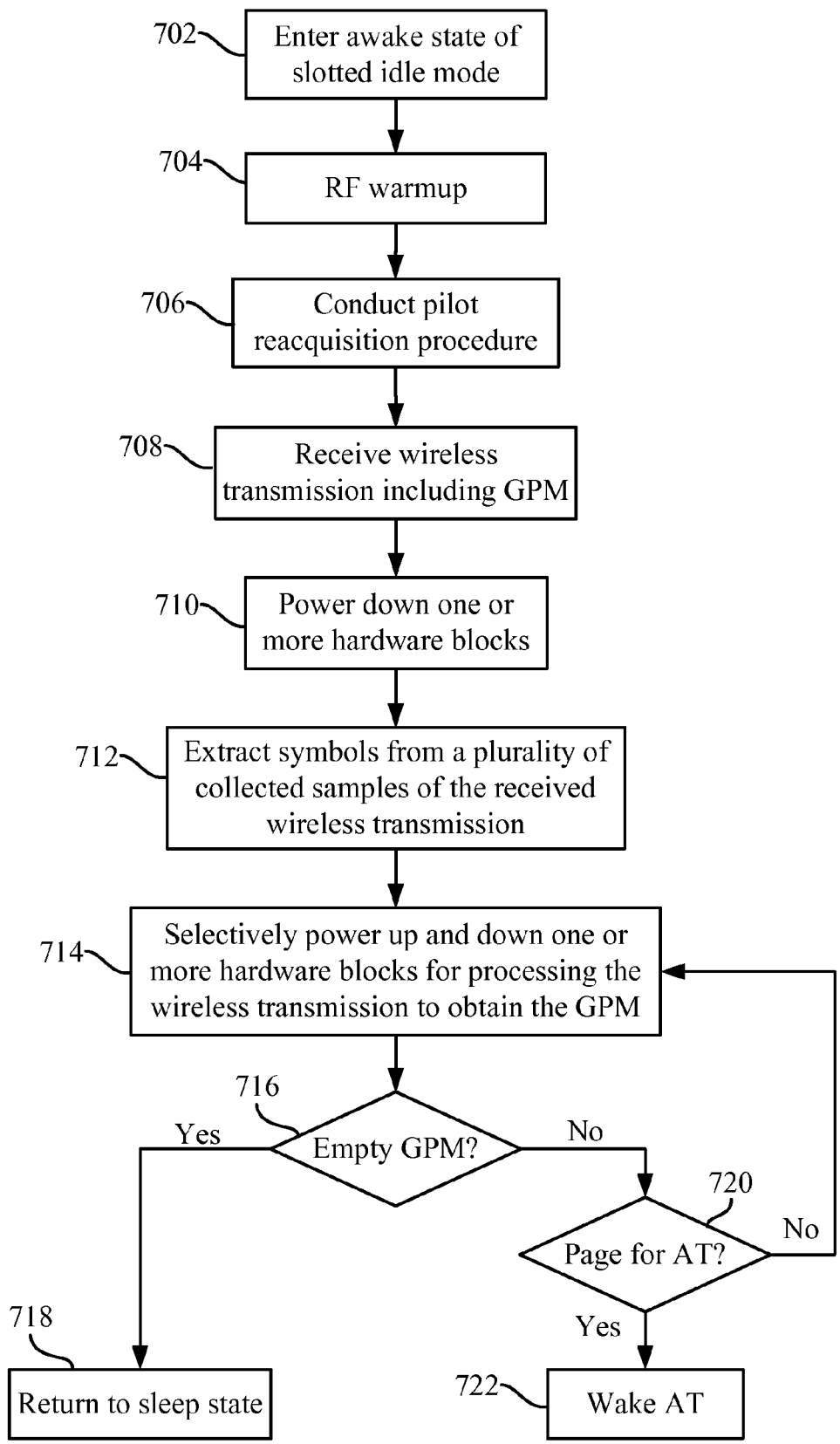
FIG. 7 is a flow diagram illustrating a method operational on an access terminal according to at least one example.

FIG. 7 is a flow diagram illustrating at least one example of a method operational on an access terminal, such as the access terminal 104. With reference to the block diagrams in FIGS. 3 and 4 together with the flow diagram in FIG. 7, an access terminal 104 may initiate an awake state of a slotted idle mode at step 702. For example, the processing circuit 306 executing the idle mode operations 310 may initiate an awake state of a slotted idle mode. In preparing for the slot boundary, when the access terminal 104 is expected to be monitoring the paging channel (PCH) for one or more general page messages (GPMs), the access terminal 104 may begin warming up the RF circuitry at step 704. For example, the processing circuit 306 may begin warming up one or more components, including the receiver portion of the communications interface 302 and/or one or more hardware blocks of the processing circuit 306.

At step 706, the access terminal 104 may conduct a pilot reacquisition procedure. For example, the processing circuit 306 may reacquire a pilot signal from the base station via the communications interface 302. The reacquisition may include determining a reacquisition slew and/or determining which multipath signal from the plurality of multipath signals is the strongest. The reacquisition slew refers to how far the pilot drifts from a peak position found during the previous awake cycle. The reacquisition may also include determining one or more channel conditions, such as a signal-to-interference ratio (e.g., filtered pilot Ec/Io and/or instantaneous pilot Ec/Io), and/or how much noise is associated with the channel. As noted above with reference to FIGS. 5 and 6, the pilot reacquisition may be performed prior to demodulation or parallel to demodulation.

At step 708, the access terminal may receive a wireless transmission that includes a general page message (GPM). For example, the processing circuit 306 may receive a wireless transmission via the communications interface on the paging channel (PCH) including one or more general page messages (GPM).

At step 710, the access terminal 104 may power down one or more hardware blocks associated with the processing circuit 306. For example, the firmware block 414 may power OFF the finger block 404 and the symbol combiner 406 (since these blocks can be skipped), as well as the de-interleaver 408 and the decoder 410. The firmware block 414 may also communicate with the processor core 412 to enable the processor core 412 to go to sleep.

While the various hardware blocks are powered down, the access terminal 104 can process the received transmission. At step 712, the access terminal 104 may extract symbols from a plurality of collected samples of the received wireless transmission. For example, the firmware block 414 may collect samples of the received wireless transmission from the sample server 402, and may extract the symbols from the collected samples. The firmware block 414 may collect the samples for a single path of a multipath signal of the received wireless transmission. The firmware block 414 may select the particular path based on which of the plurality of multipath signals is the strongest. As already described herein, the strongest multipath signal may be identified in some examples from a reacquisition procedure conducted during a previous awake cycle.

At step 714, the access terminal 104 may selectively power up and down one or more hardware blocks for processing the received wireless transmission to obtain the general page message (GPM). For example, the firmware block 414 may power ON the de-interleaver 408 and may convey the extracted symbols to the de-interleaver 408. The de-interleaver 408 can obtain the symbols and de-interleave (e.g., re-order) the symbols to an original order. The firmware block 414 may subsequently power ON the decoder 410 and may convey the re-ordered symbols to the decoder 410. The decoder 410 can obtain the symbols and decode the coded symbols to obtain the general page message therefrom.

If, at step 716, the general page message (GPM) is empty (e.g., does not include pages for any access terminals), the access terminal 104 may return to the sleep state of the slotted idle mode at step 718. In some examples, the firmware block 414 may determine that the general page message (GPM) is empty and may initiate procedures for returning the access terminal 104 to the sleep state. In such examples, the firmware block 414 may allow the processor core 412 to remain asleep.

On the other hand, if the general page message (GPM) includes one or more pages at step 716, then the access terminal 104 may determine whether the general page message (GPM) includes a page intended for the access terminal 104 at step 720. If the general page message (GPM) includes a page intended for the access terminal 104, the access terminal 104 may wake up at step 722. For example, the firmware block 414 may awaken the processor core 412 to conduct further communications with the base station for completing any requested operations. If the non-empty general page message (GPM) does not include a page intended for the access terminal 104 at step 720, the access terminal 104 can return to step 714 in order to process the next general page message (GPM) for the particular awake cycle.

Figure 8:
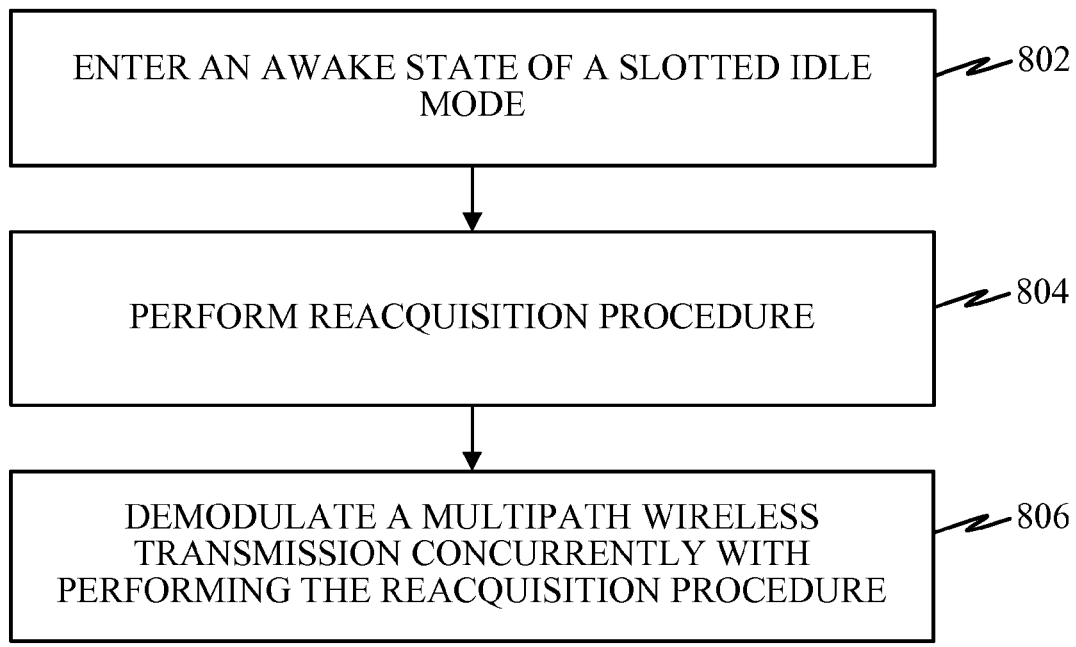
FIG. 8 is a flow diagram illustrating a method operational on an access terminal for concurrently performing reacquisition and demodulation according to at least one example.

Turning to FIG. 8, a flow diagram is shown illustrating a method operational on an access terminal for concurrently performing reacquisition and demodulation according to at least one example. With reference to FIGS. 3, 4 and 8, the access terminal 104 may enter into an awake state of the slotted idle mode at step 802. For example, the processing circuit 306 may, in response to receiving an interrupt request (IRQ), warm up one or more receiver components of the communications interface 302 and/or one or more hardware blocks of the processing circuit 306.

At step 804, the access terminal 104 may perform a reacquisition procedure concurrently with a wireless transmission demodulation at step 806. For example, the processing circuit 306 may perform the reacquisition procedure after the slot boundary. The reacquisition procedure may include reacquisition of the pilot signal to determine factors such as timing drift relative to the previous awake state, as well as the strongest multipath pilot signal. Instead of employing the results from the present reacquisition procedure 608, the processing circuit 306 may store this information in the storage medium 304 for use in the next awake cycle. In some examples, the reacquisition procedure may also include determining one or more channel conditions, such as a signal-to-interference ratio (e.g., filtered pilot Ec/Io and/or instantaneous pilot Ec/Io), and/or how much noise is associated with the channel. These results may be employed by the processing circuit 306 to determine whether or not it should continue performing reacquisition and demodulation in parallel. For instance, the processing circuit 306 may be adapted to perform the reacquisition procedure concurrently with the wireless transmission demodulation in the next awake state when the channel conditions are above some predetermined threshold and/or when the timing drift is less than a predetermined threshold.

At step 806, the access terminal 104 also demodulates a multipath wireless transmission concurrently with performing the reacquisition procedure at step 804. For example, the processing circuit 306 may demodulate the multipath wireless transmission received via the communications interface 302. Determining which multipath signal from the plurality of multipath signals to use for demodulation may be based on the results obtained from a reacquisition procedure performed during a previous awake state of the slotted idle mode. The demodulation may include collecting samples by the firmware block 414 (see FIG. 4) for a selected path of the multipath wireless transmission, which path was determined to be the strongest path in the previous awake state of the slotted idle mode. The demodulation 610 can also include extraction by the firmware block 414 of symbols from the collected samples, and employment by the firmware block 414 of the de-interleaver 408 and the decoder 410 to process the symbols and obtain the general page message (GPM).

While the above discussed aspects, arrangements, and embodiments are discussed with specific details and particularity, one or more of the components, steps, features and/or functions illustrated in FIGS. 1, 2, 3, 4, 5, 6, 7 and/or 8 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 3 and/or 4 may be configured to perform or employ one or more of the methods, features, parameters, or steps described in FIGS. 2, 5, 6, 7 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
   a communications interface;
   a storage medium; and
   a processing circuit coupled to the communications interface and the storage medium, and firmware operably coupled to the processing circuit, the processing circuit adapted to:
   enter an awake state of a slotted idle mode;
   power down, by the firmware, a plurality of hardware blocks of the processing circuit;
   collect, by the firmware, samples of a wireless transmission received via the communications interface for a single path of a multipath signal;
   extract, by the firmware, a plurality of symbols from the collected samples;
   power up, by the firmware, individual hardware blocks from among the plurality of hardware blocks for processing the plurality of symbols, wherein the individual hardware blocks from among the plurality of hardware blocks comprise a decoder and a de-interleaver, and the decoder and the de-interleaver are powered up to obtain a general page message (GPM) from the plurality of symbols.

2. The access terminal of claim 1, wherein the processing circuit adapted to power down, by the firmware, the plurality of hardware blocks of the processing circuit is adapted to:
   keep at least some of the plurality of hardware blocks from powering ON when the processing circuit enters the awake state of the slotted idle mode.

3. The access terminal of claim 1, wherein the plurality of hardware blocks of the processing circuit further comprises:
   a processor core; and
   the firmware operably coupled to the processor core, the de-interleaver and the decoder.

4. The access terminal of claim 3, wherein the processing circuit adapted to power down, by the firmware, the plurality of hardware blocks of the processing circuit is adapted to:
   enable the processor core to sleep;
   power OFF the de-interleaver; and
   power OFF the decoder.

5. The access terminal of claim 3, wherein the firmware is adapted to:
   collect the samples of the wireless transmission received via the communications interface; and
   extract the plurality of symbols from the collected samples.

6. The access terminal of claim 3, wherein the processing circuit adapted to power up, by the firmware, the individual hardware blocks from among the plurality of hardware blocks for processing the plurality of symbols is adapted to:
   power ON the de-interleaver;
   convey the plurality of symbols to the de-interleaver to re-order the symbols;
   power ON the decoder; and
   convey the re-ordered symbols to the decoder to decode the re-ordered symbols for the obtained general page message therefrom.

7. The access terminal of claim 6, wherein the firmware is further adapted to:
   awaken the processor core when the obtained general page message includes a page intended for the access terminal.

8. The access terminal of claim 1, wherein the processing circuit is further adapted to:
   perform a reacquisition procedure in parallel with the collection of samples of the wireless transmission; and
   store one or more parameters determined from the reacquisition procedure in the storage medium for use in a subsequent awake state of the slotted idle mode.

9. The access terminal of claim 8, wherein parameters determined from the reacquisition procedure comprise:
   a drift of a pilot signal relative to a previous awake state; and
   identification of a strongest multipath pilot signal to be employed in the subsequent awake state.

10. The access terminal of claim 8, wherein the single path is selected based on a strongest path of a pilot signal determined during a previous awake state of the slotted idle mode.

11. The access terminal of claim 1, wherein the processing circuit is further adapted to decode the plurality of symbols to obtain at least one information bit.

12. The access terminal of claim 1, wherein the single path of the multipath signal is a strongest path determined from a pilot reacquisition procedure conducted during an awake cycle, the awake cycle comprising a current awake cycle and a previous awake cycle.

13. A method operational on an access terminal, comprising:
receiving a wireless transmission including a general page message (GPM) during an awake cycle of a slotted idle mode;
extracting symbols from a plurality of collected samples of the received wireless transmission, wherein the plurality of collected samples are collected for a single path of a multipath signal;
selectively powering up and powering down, by firmware, individual hardware blocks from among a plurality of hardware blocks for processing the received wireless transmission to obtain the general page message, wherein the individual hardware blocks from among the plurality of hardware blocks comprise a decoder and a de-interleaver, and the decoder and the de-interleaver are powered up to obtain the general page message from the symbols.

14. The method of claim 13, wherein the single path is selected based on a strongest path of a pilot signal determined during a previous awake state of the slotted idle mode.

15. The method of claim 13, wherein extracting the symbols from the plurality of collected samples of the received wireless transmission comprises:
collecting, by the firmware, the plurality of samples; and
extracting, by the firmware, the symbols from the plurality of collected samples.

16. The method of claim 13, wherein selectively powering up and powering down, by the firmware, the individual hardware blocks from among a plurality of hardware blocks comprises:
powering OFF the de-interleaver and the decoder for a period when the symbols are extracted from the collected samples of the received wireless transmission;
powering ON the de-interleaver to re-order the symbols to an original order; and
powering ON the decoder to decode the re-ordered symbols and obtain the general page message therefrom.

17. The method of claim 13, wherein selectively powering up and powering down, by the firmware, the individual hardware blocks from among a plurality of hardware blocks comprises:
putting a processor core to sleep for a period when the symbols are extracted from the collected samples of the received wireless transmission, and when the individual hardware blocks are selectively powered up and down for processing the received wireless transmission to obtain the general page message;
waking up the processor core when the general page message includes a page intended for the access terminal.

18. The method of claim 13, further comprising:
conducting a pilot reacquisition procedure concurrent with extraction of the symbols from the plurality of collected samples of the received wireless transmission; and
storing one or more parameters determined from the reacquisition procedure for use in a subsequent awake state of the slotted idle mode.

19. An access terminal, comprising:
means for receiving a wireless transmission including a general page message (GPM) during an awake cycle of a slotted idle mode;
means for extracting symbols from a plurality of collected samples of the received wireless transmission, wherein the plurality of collected samples are collected for a single path of a multipath signal;
means for selectively powering up and powering down, by firmware, individual hardware blocks from among a plurality of hardware blocks for processing the received wireless transmission to obtain the general page message, wherein the individual hardware blocks from among the plurality of hardware blocks comprises a decoder and a de-interleaver, and the decoder and the de-interleaver are powered up to obtain the general page message (GPM) from the symbols.

20. The access terminal of claim 19, further comprising:
means for conducting a pilot reacquisition procedure concurrent with extraction of the symbols from the plurality of collected samples of the received wireless transmission; and
means for storing one or more parameters determined from the reacquisition procedure for use in a subsequent awake state of the slotted idle mode.

21. A non-transitory computer-readable storage medium, comprising programming operational on an access terminal for:
powering down a plurality of hardware blocks of a processing circuit;
collecting samples of a wireless transmission during an awake state of a slotted idle mode for a single path of a multipath signal;
extracting a plurality of symbols from the collected samples;
selectively powering up, by firmware, individual hardware blocks from among the plurality of hardware blocks for processing the plurality of symbols, wherein the individual hardware blocks from among the plurality of hardware blocks comprise a decoder and a de-interleaver, and the decoder and the de-interleaver are powered up to obtain a general page message (GPM) from the plurality of symbols.

22. The non-transitory computer-readable storage medium of claim 21, wherein the plurality of hardware blocks of the processing circuit further comprises:
a processor core; and
the firmware operably coupled to the processor core, the de-interleaver and the decoder.

23. The non-transitory computer-readable storage medium of claim 22, wherein powering down the plurality of hardware blocks of the processing circuit comprises:
enabling the processor core to sleep;
powering OFF the de-interleaver; and
powering OFF the decoder.

24. The non-transitory computer-readable storage medium of claim 22, wherein selectively powering up individual hardware blocks from among the plurality of hardware blocks for processing the plurality of symbols comprises:
powering ON the de-interleaver to re-order the symbols; and
powering ON the decoder to decode the re-ordered symbols for obtaining the general page message therefrom.

25. The non-transitory computer-readable storage medium of claim 24, wherein selectively powering up individual hardware blocks from among the plurality of hardware blocks for processing the plurality of symbols further comprises:
   awakening the processor core when the obtained general page message includes a page intended for the access terminal.

26. The non-transitory computer-readable storage medium of claim 21, further comprising programming for:
   performing a reacquisition procedure in parallel with the collection of samples of the wireless transmission; and
   storing one or more parameters determined from the reacquisition procedure for use in a subsequent awake state of the slotted idle mode.

27. An access terminal, comprising:
   a communications interface;
   a storage medium; and
   a processing circuit coupled to the communications interface and the storage medium, the processing circuit adapted to:
      enter an awake state of a slotted idle mode;
      perform a reacquisition procedure;
      demodulate a wireless transmission received via the communications interface concurrently with the reacquisition procedure, wherein the processing circuit comprises a decoder and a de-interleaver, and the decoder and the de-interleaver are powered up, by firmware, to obtain a general page message (GPM) from a plurality of symbols.

28. The access terminal of claim 27, wherein the reacquisition procedure comprises:
   determination of a pilot signal drift relative to a previous awake state of the slotted idle mode; and
   determination of a strongest path of a multipath pilot signal.

29. The access terminal of claim 27, wherein the processing circuit is further adapted to:
   store one or more parameters determined from the reacquisition procedure in the storage medium for use in a subsequent awake state of the slotted idle mode.

30. The access terminal of claim 27, wherein the demodulation of the wireless transmission comprises:
   collection of samples of the wireless transmission for a selected path of a multipath signal, wherein the path is selected based on a strongest multipath pilot signal determined in a previous awake state of the slotted idle mode; and
   extraction of plurality of symbols from the collected samples.

31. A method operational on an access terminal, comprising:
   entering an awake state of a slotted idle mode;
   performing a reacquisition procedure;
   demodulating a multipath wireless transmission concurrently with performing the reacquisition procedure, wherein a decoder and a de-interleaver in the access terminal are powered up, by firmware, to obtain a general page message (GPM) from a plurality of symbols.

32. The method of claim 31, wherein performing the reacquisition procedure comprises:
   determining a pilot signal drift relative to a previous awake state of the slotted idle mode; and
   determining a strongest path of a multipath pilot signal.

33. The method of claim 31, further comprising:
   storing one or more parameters determined from the reacquisition procedure for use in a subsequent awake state of the slotted idle mode.

34. The method of claim 31, wherein demodulating the multipath wireless transmission comprises:
   collecting samples for a selected path of the multipath wireless transmission, wherein the path is selected based on a strongest multipath pilot signal determined in a previous awake state of the slotted idle mode; and
   extracting the plurality of symbols from the collected samples.

35. An access terminal, comprising:
   means for entering an awake state of a slotted idle mode;
   means for performing a reacquisition procedure; and
   means for demodulating a multipath wireless transmission concurrently with performing the reacquisition procedure, wherein a decoder and a de-interleaver in the access terminal are powered up, by firmware, to obtain a general page message (GPM) from a plurality of symbols.

36. A non-transitory computer-readable storage medium, comprising programming operational on an access terminal for:
   entering an awake state of a slotted idle mode;
   performing a reacquisition procedure; and
   demodulating a multipath wireless transmission concurrently with performing the reacquisition procedure, wherein a decoder and a de-interleaver in the access terminal are powered up, by firmware, to obtain a general page message (GPM) from a plurality of symbols.

* * * * *